United States Patent
Watts

(10) Patent No.: US 9,234,989 B1
(45) Date of Patent: Jan. 12, 2016

(54) ROBUSTLY MOUNTED, SINGLE DOF, ADJUSTABLE MIRROR

(75) Inventor: Alan Watts, Winter Park, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1242 days.

(21) Appl. No.: 12/874,427

(22) Filed: Sep. 2, 2010

(51) Int. Cl.
*G02B 5/04* (2006.01)
*G02B 7/182* (2006.01)
*G02B 7/198* (2006.01)
*G02B 7/18* (2006.01)

(52) U.S. Cl.
CPC *G02B 5/04* (2013.01); *G02B 7/182* (2013.01); *G02B 7/1805* (2013.01); *G02B 7/198* (2013.01)

(58) Field of Classification Search
CPC ........ G02B 5/04; G02B 7/1805; G02B 7/182; G02B 7/198
USPC .......... 359/831, 833, 872, 871, 900
See application file for complete search history.

(56) References Cited

U.S. PATENT DOCUMENTS

| | | | |
|---|---|---|---|
| 3,045,551 A * | 7/1962 | Bonanno | 359/508 |
| 3,515,464 A * | 6/1970 | Peifer et al. | 359/833 |
| 3,520,595 A * | 7/1970 | Treuthart | 359/222.1 |
| 3,649,105 A * | 3/1972 | Treuthart | 359/222.1 |
| 3,814,365 A | 6/1974 | Mackenzie | |
| 4,182,552 A * | 1/1980 | Feinbloom | 359/837 |
| 4,200,359 A * | 4/1980 | Lawson | 359/850 |
| 4,311,363 A * | 1/1982 | Marsalka et al. | 359/864 |
| 4,526,446 A * | 7/1985 | Adams | 359/864 |
| 4,717,224 A * | 1/1988 | Diehl et al. | 359/220.1 |
| 4,932,769 A * | 6/1990 | Goosen | 359/865 |
| 5,050,977 A * | 9/1991 | Platzer, Jr. | 359/866 |
| 5,323,259 A * | 6/1994 | Gibbs | 359/211.1 |
| 5,450,246 A | 9/1995 | Jain | |
| 5,682,236 A | 10/1997 | Trolinger et al. | |
| 5,768,001 A * | 6/1998 | Kelley et al. | 359/196.1 |
| 5,923,461 A | 7/1999 | Allen et al. | |
| 6,144,483 A | 11/2000 | Allen et al. | |
| 6,690,268 B2 | 2/2004 | Schofield et al. | |
| 6,775,077 B1 * | 8/2004 | Feng | 359/831 |
| 7,446,650 B2 | 11/2008 | Scholfield et al. | |
| 7,579,940 B2 | 8/2009 | Schofield et al. | |
| 2008/0158679 A1 | 7/2008 | Luty et al. | |

FOREIGN PATENT DOCUMENTS

WO        0164481 A3    9/2001

* cited by examiner

*Primary Examiner* — Ricky D Shafer
(74) *Attorney, Agent, or Firm* — Withrow & Terranova, PLLC

(57) ABSTRACT

A method of mounting and adjusting a mirror (and a concomitant mount and mirror apparatus) comprising providing a mount surface and mounting a mirror approximately parallel to the mount surface but at an offset angle alpha.

5 Claims, 3 Drawing Sheets

ROBUSTLY MOUNTED, SINGLE DOF, ADJUSTABLE MIRROR

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to mirrors for optics applications and to methods for adjustment of same.

2. Description of Related Art

Historically it is difficult to provide an adjustable mirror that is both robustly mounted and that is relatively unaffected by dynamic loads. Typically the adjustment method becomes difficult to constrain and puts non-planar stresses in the mirror, distorting the reflective surface and degrading the image quality. Clamping forces applied after alignment tends to act along the adjustment vectors, causing misalignment and forcing iterations and use of "windage" during system alignment.

Mirrors are typically adjusted by displacing one edge of the mirror out of the mounting plane to generate a small tilt. This is accomplished by shimming or by incorporating a screw type adjustment device with a spherical washer mount.

Shimming is a trial and error method that can be time consuming and usually induces out of plane loads which distort the mirror surface. Screw type adjustments require additional precision hardware, add complexity, and are limited in resolution of adjustment to standard thread pitches. Both methods require operator expertise, take time, and tend to move when the final clamping load is applied.

Accordingly, mirrors are typically: (1) Difficult to adjust without cross talk into the other axis; (2) Susceptible to movement when clamping; (3) Susceptible to surface distortions when clamping; (4) Fairly complex, requiring multiple precision components; and (5) Requiring ample time to adjust and clamp during alignment.

The present invention provides a fine angular adjustment in one axis and allows a robust restraint system for the mirror, which is relatively insensitive to clamping and dynamic forces.

BRIEF SUMMARY OF THE INVENTION

The present invention is of a method of mounting and adjusting a mirror (and a concomitant mount and mirror apparatus), comprising: providing a mount surface; and mounting a mirror approximately parallel to the mount surface but at an offset angle alpha. In the preferred embodiment, alpha is between approximately 1 and 100 milliradians, more preferably between approximately 5 and 50 milliradians, and most preferably approximately 10 milliradians. Mounting comprises adjusting the offset angle alpha by rotating the mirror about an axis normal to the mount surface.

The invention is additionally of a method of mounting and adjusting a mirror (and a concomitant mount and mirror apparatus), comprising: providing a mount surface; mounting a mirror parallel to the mount surface; and adjusting the mirror such that it is approximately parallel to the mount surface but at an offset angle alpha. In the preferred embodiment, alpha is between approximately 1 and 100 milliradians, more preferably between approximately 5 and 50 milliradians, and most preferably approximately 10 milliradians. Adjusting comprises adjusting the offset angle alpha by rotating the mirror about an axis normal to the mount surface.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a robustly mounted, fine angular, single degree of freedom (DOF) adjustable mirror and concomitant methods of making and use. The invention incorporates a very straightforward mounting method, minimal piece parts, requires minimal alignment time, and provides secure clamping and retention after alignment.

The invention takes advantage of small angle approximation. A small offset angle (alpha) is built into the mirror and its corresponding mount. Preferably, this angle is constrained, at the minimum, by allowable manufacturing and processing tolerances, and, at the maximum, by the magnitude of the crosstalk that the optical system can tolerate. The example angle of 10 milliradians is given only for the purpose of describing the invention. When mounted, the reflective surface is offset from the reflective mirror surface by this angle alpha. At the nominal position, the reflective surface of the mirror is at the desired angle (1/2 beta) to reflect the beam at the desired angle beta.

Figure 1:
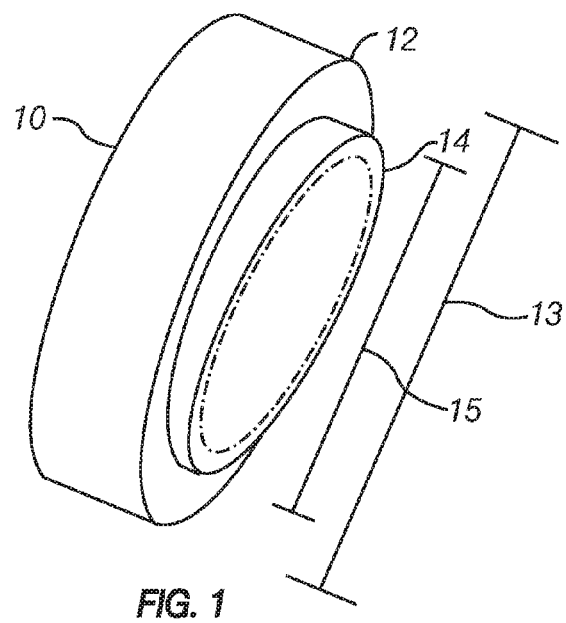
FIG. 1 is a perspective view of the mirror of the invention.
Figure 2:
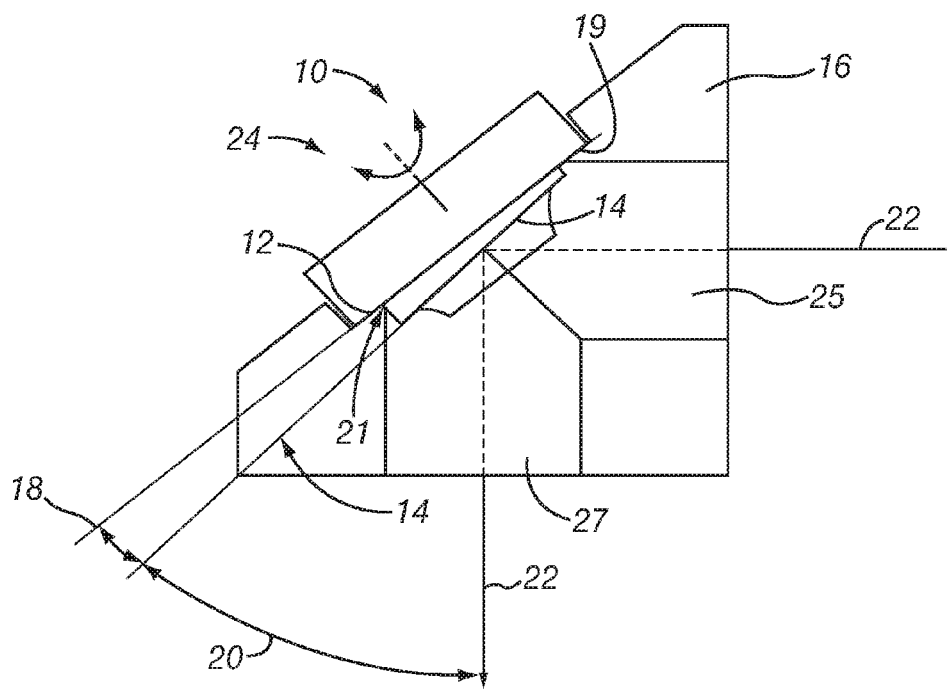
FIG. 2 is a side view of the mirror of the invention on a mechanical mount.

Referring to FIGS. 1-2, the mirror 10 of the invention comprises mount surface 12 having a first diameter 13 and reflective surface 14 having a second diameter 15, with the mirror 10 preferably mounted on a mechanical mount 16. The second diameter 15 is less than the first diameter 13. The small offset angle 18 (alpha) is created between the reflective surface 14 and the mirror's mount surface 12. A corresponding angle is preferably machined into the mechanical mount 16. The mechanical mount 16 includes a shoulder 19 that forms an opening 21 having a diameter that is greater than the second diameter 15 and less than the first diameter 13. The mechanical mount 16 also includes a first light channel 25 that receives a light ray, such as a gut ray 22. The reflective surface 14 reflects the gut ray 22 down a second light channel 27. At the nominal position, the reflective surface 14 is at the desired angle 20 (beta, measured with respect to path of gut ray 22), reflecting energy at the specified LOS (Line Of Sight) angle. Adjustment is accomplished by rotating the mirror about an axis 24 normal to its mounting plane. As the mirror rotates, a small tilt is generated in the primary adjustment axis.

Figure 3:
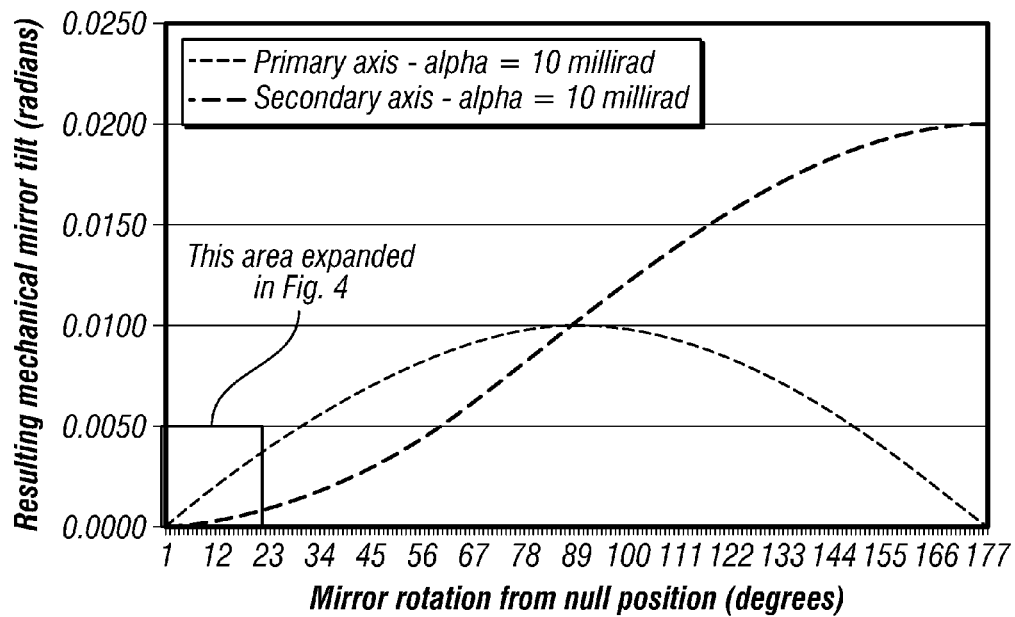
FIG. 3 is a graph showing the resulting mirror tilts in the primary and secondary axis for a given mirror rotation.
Figure 4:
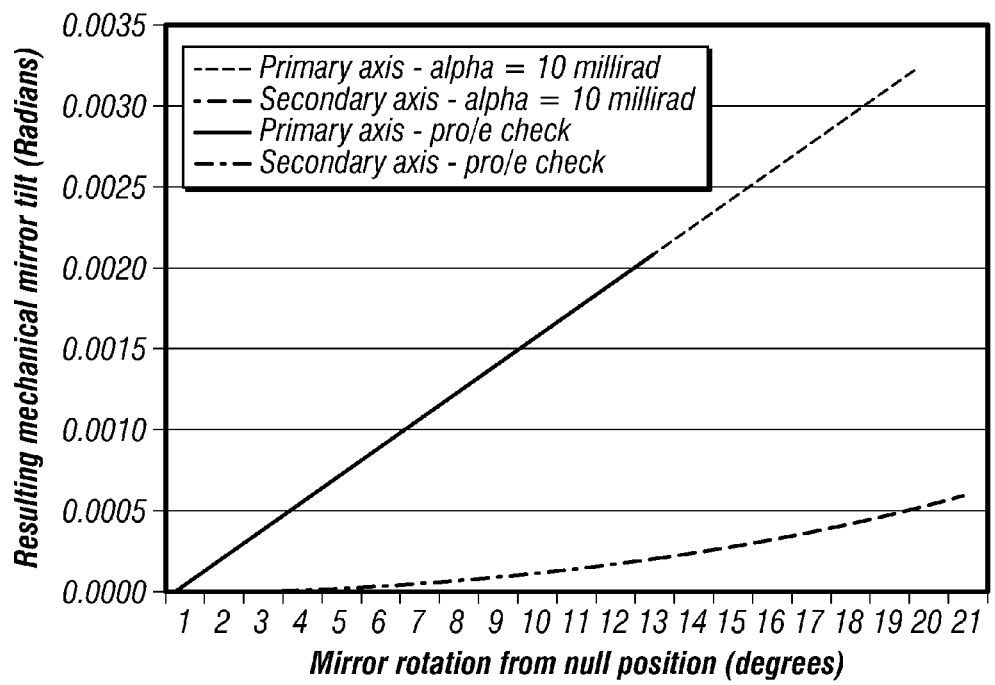
FIG. 4 is a graph expanding view of a section of the graph of FIG. 3.

As noted, when the mirror is rotated normal to the mounting surface plane, a small tilt is generated in the primary adjustment axis. A tilt is also generated in the secondary axis, but for small degrees of rotation this is negligible. FIGS. 3-4 show the resultant tilt generated in the primary and secondary axes for a given mirror tilt alpha. The mirror tilt angle, alpha, controls the resolution of adjustment (angular LOS adjustment/degrees of mirror rotation). In this example, alpha is set at 10 milliradians. The resolution is thus (0.0015 radian/10 degrees)×2=300 microradians/degree. Alpha is preferably selected during the design of the system incorporating the mirror of the invention.

Figure 5:
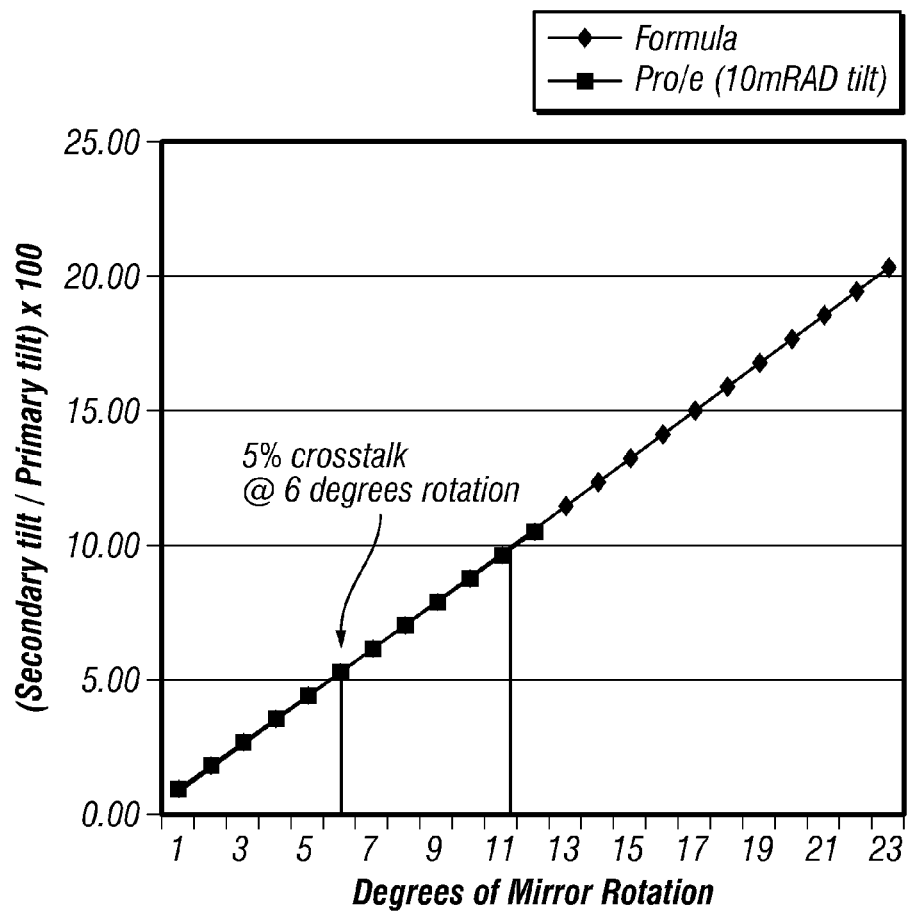
FIG. 5 is a graph showing percentage of undesired secondary axis angular tilt with respect to the primary axis angular tilt for a given mirror rotation.

The resultant secondary axis tilt also increases with increasing mirror rotation. FIG. 5 shows the percentage of the unwanted secondary axis angular shift with respect to the primary axis angular shift for a given mirror rotation. So, for instance, at 6 degrees rotation there is a 5% crosstalk.

The mirror is preferably mounted using any traditional mirror mounting and clamping methods. During assembly and alignment, a small clamping load is preferably applied via a spring force to restrain the mirror but still allow rotation. The load is fully clamped and restrained once the alignment is completed, restricting rotation. If the mirror is fairly balanced, there are minimal dynamic forces acting in a direction to generate a shift in alignment.

The mirror must preferably be restrained from in-plane translation. This is preferably done by using a loose "shaft-to-bore" fit of an OD on the mirror to a bore in the mount. Once adjusted, the mirror is clamped against its mounting surface using traditional methods. A load normal to the mounting plane will fully restrain the mirror. It is also preferably adhesively staked to prevent any minute in-plane displacements under dynamic loads. Since the adjustment occurs in plane, the mirror maintains solid mounting contact during alignment. Clamping will not disturb the adjusted position and surface distortion will be minimal. With such a straightforward mounting method, the mirror will retain its position under dynamic loading. Rotational forces which can cause shifts in alignment will be small and hard to generate. Adjustment in two independent DOF can be accomplished by combining two mirrors in the optical path.

The invention offers several advantages: (1) The mirror can be mounted via traditional methods, being clamped rigidly to a mounting plane. The mounting interfaces are fixed, they are not adjusted. This will minimize surface stresses in the mirror. (2) There is a wide range of possible resolutions (mirror tilt in the primary axis per degree of rotation). This is limited only by the accuracy of the manufacturing method used to fabricate the mirror wedge and the mounting surface. (3) Stability during adjustment is another advantage. There should be no forces acting to displace the mirror during clamping. The adjustment is done within the mounting plane, so clamping after alignment should not impart any forces to cause a mirror shift during this operation. (4) The cost is low because there is a minimal part count and the machining operations are standard processes. (5) A system with two mirrors according to the invention mounted orthogonally to each other will have two independent orthogonal axes of adjustment in tilt.

The simple, robust mounting of the invention reduces negative impacts on image quality. Components with reflective surfaces are typically the largest contributors to structural LOS jitter. The present invention minimizes the number of mounting interfaces, which reduces contributors to structural jitter. Also, reflective planar surfaces typically show some distortion after clamping, which degrades image quality. The present invention minimizes distortion by adjusting the mirror within its mounting plane. The invention maintains the same mounting plane for all angles of adjustment.

In the preferred embodiment, and as readily understood by one of ordinary skill in the art, the apparatus according to the invention can include a general or specific purpose computer or distributed system programmed with computer software directing mirror rotation, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of mounting and adjusting a mirror, the method comprising the steps of:
   providing a mirror having a mount surface having a first diameter and a reflective surface having a second diameter that is less than the first diameter and that is at an offset angle alpha with respect to the mount surface;
   mounting the mirror to a mechanical mount having a shoulder that forms an opening having a diameter greater than the second diameter and less than the first diameter, the mount surface of the mirror and the shoulder of the mechanical mount contacting one another at a mounting plane;

adjusting the offset angle alpha by rotating the mirror with respect to the mechanical mount about an axis normal to the mounting plane to adjust a direction of a reflected light ray; and fixing the mirror to the mechanical mount to inhibit further rotation of the mirror with respect to the mechanical mount.

2. The method of claim 1 wherein the offset angle alpha is between approximately 1 and 100 milliradians.

3. The method of claim 2 wherein the offset angle alpha is between approximately 5 and 50 milliradians.

4. The method of claim 3 wherein the offset angle alpha is approximately 10 milliradians.

5. The method of claim 1, further comprising:

receiving, via a first light channel in the mechanical mount, a light ray; and reflecting, via the reflective surface, the light ray down a second light channel in the mechanical mount.

\* \* \* \* \*